US007379923B2

(12) United States Patent
Burchfield et al.

(10) Patent No.: US 7,379,923 B2
(45) Date of Patent: May 27, 2008

(54) BENCHMARKING OF COMPUTER AND NETWORK SUPPORT SERVICES

(75) Inventors: Nancy L. Burchfield, Dana Point, CA (US); Chester M. Mauk, Waynesboro, PA (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/703,901

(22) Filed: Nov. 6, 2003

(65) Prior Publication Data
US 2005/0102176 A1 May 12, 2005

(51) Int. Cl.
G06F 17/00 (2006.01)

(52) U.S. Cl. ...................................... 705/400; 705/500

(58) Field of Classification Search ................ 705/400, 705/26
See application file for complete search history.

(56) References Cited

U.S. PATENT DOCUMENTS

| 2002/0082988 | A1 | 6/2002 | Ujiie et al. | 705/39 |
| 2002/0173990 | A1 | 11/2002 | Marasco | 705/2 |
| 2006/0010087 | A1* | 1/2006 | Karasawa | 705/500 |

FOREIGN PATENT DOCUMENTS

WO    WO 03/054763 A1    7/2003

OTHER PUBLICATIONS

"Doing the Contractor's Bidding", VARbusiness, p113 Jun. 1991.*
"Evaluation of concrete pavement construction scenarios under performance-related specifications" Gharaibeh et al, Transportation research record, 2002 (1813) 21-27.*

* cited by examiner

*Primary Examiner*—John W. Hayes
*Assistant Examiner*—Rutao Wu
(74) *Attorney, Agent, or Firm*—Duke W. Yee; Arthur J. Samodovitz; Gerald H. Glanzman

(57) ABSTRACT

A process and computer program product for adjusting a price derived from a benchmark computer service model to a price of a computer service contract, or vice versa. Differences in service between the benchmark computer service model and the computer service contract are determined. Then, a price adjustment due to the differences is determined. The price adjustment may be based on incremental cost of labor and tools to account for the differences between the benchmark computer service and the computer service contract. Then, the price of the benchmark computer service model is compared to the price of the computer service contract with the price adjustment. The benchmark computer service model and the computer service contract can both include computer program support services, computer hardware support services, a help desk call center service and/or network maintenance services. The differences between the benchmark computer service and the computer service contract may comprise a difference in type of a computer service, a quantity of a computer service, quality of a computer service, and/or complexity of a computer service. The differences may comprise support for a customer's computer hardware or computer programs which is more difficult to support than computer hardware or computer programs specified in the benchmark service model. The differences may comprise a service constraint in the service contract which is not present in the benchmark service model.

1 Claim, 1 Drawing Sheet

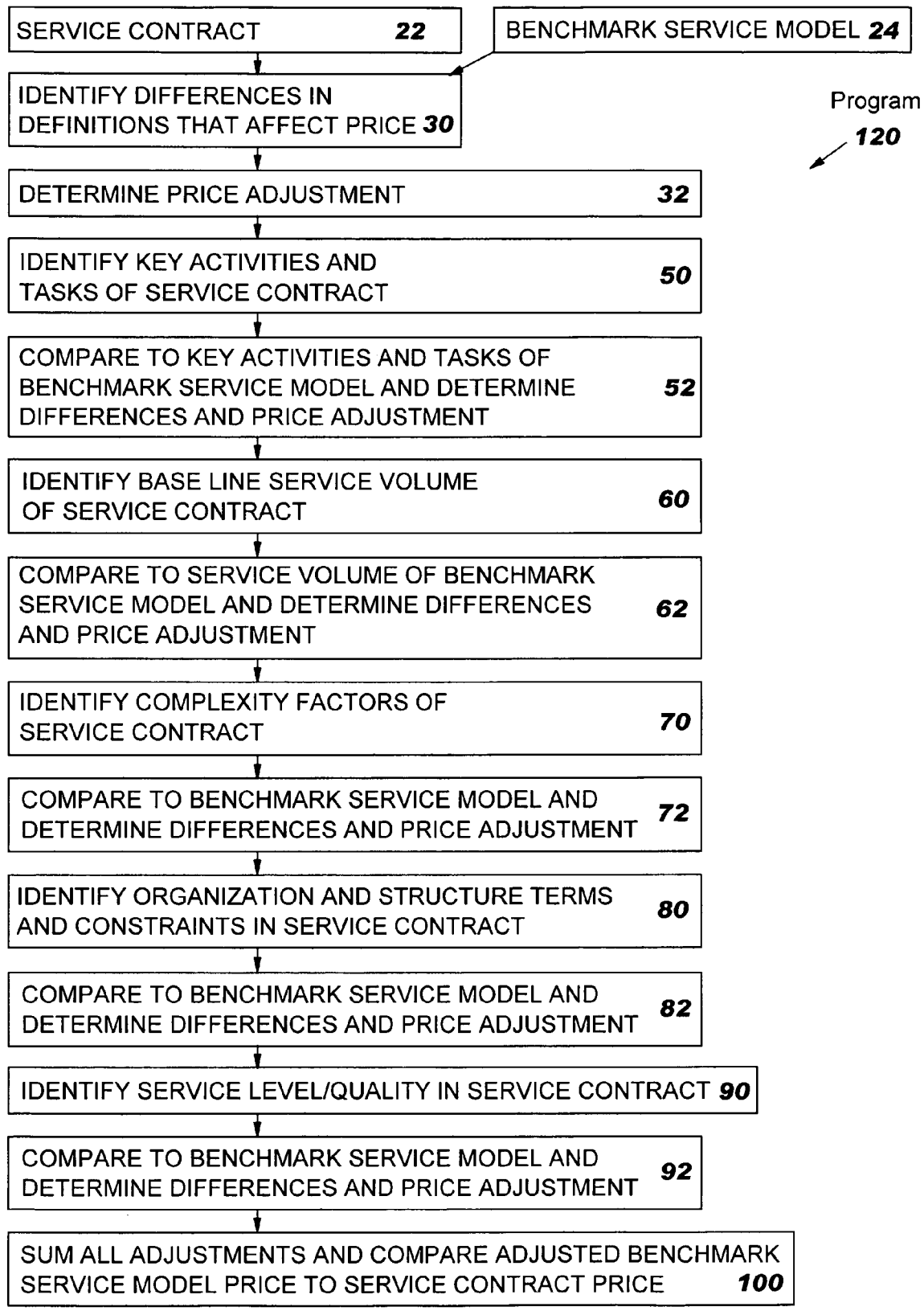

BENCHMARKING OF COMPUTER AND NETWORK SUPPORT SERVICES

BACKGROUND OF THE INVENTION

The invention relates generally to techniques to benchmark the price of computer related services, and deals more particularly with a technique to accurately benchmark the market price of computer hardware and program support services, network hardware and program support services, and other computer related services.

Many service providers today provide computer hardware and program support services and network hardware and program support services to other, customer companies. This can be part of a complete or partial outsourcing of these support services. These support services include support for desk top computers, work stations, laptop computers, servers and networks, management of servers and networks, and development and maintenance of software applications. These support services encompass a wide range of activities. For example, the support of programs may include installation of newer versions of software, and fixing problems relating to use of the programs. The support of the hardware may include installation of additional memory or other hardware components, or replacement of antiquated systems. The management of the servers may include server monitoring, performance and capacity management, security services, web hosting services, etc. The service provider may also provide the network circuits used by the customer, update the network hardware and software as needed, and manage availability and operation of the network. Typically, support for computer hardware and programs and network hardware and programs includes a help desk call center.

Often, there is a long term service contract between the customer company and the service provider. The contract will specify the services to be provided to the customer company, and specify the yearly price of the services or provide a price formula to dynamically determine a price based on service volume and other factors. However, it is difficult to estimate a fair market price or devise an accurate formula for the services prices in future years because of market dynamics. While inflation tends to increase the price of services, new efficiencies emerge every year from new automated support tools and techniques. Also, the hardware and programs which are being supported may require less support over time, as they become more and more "autonomic" and reliable. So, the customer company may expect that the price of the services will be periodically reevaluated, and this may be written into the service contract. Thus, the contact may include a "benchmarking" provision, whereby the price of each service provided under the contract is compared to a "benchmark". In fact, benchmarking companies have sprung up to provide these comparisons. Some benchmarking companies have developed benchmark service models which include specified types and volumes of computer and network support services, and a corresponding cost versus a price for each service silo. The benchmarking company then compares its closest cost-based match to the service contract being benchmarked, to determine if the service contract price is fair. Other benchmarking companies identify other providers of similar services as those specified in the service contract, and ask these other providers to reveal their charge for providing these services. These charges from the other service providers are then compared to the prices specified in the service contract for the customer company to determine if the service contract price is fair. Problems have arisen because the benchmark comparators were not equivalent to the services provided under the service contract. This has resulted in discrepancies between the different benchmark methodologies, and a wide range between benchmark results depnding on the methodology employed (cost-based or price-based) and also the normalization applied.

Accordingly, an object of the present invention is to improve the process of benchmarking the price of computer hardware and program support services, network hardware and program support services, and other, computer related services.

SUMMARY OF THE INVENTION

The invention resides in a process and computer program product for adjusting a price derived from a benchmark computer service model to a price of a computer service contract, or vice versa. Differences in service between the benchmark computer service model and the computer service contract are determined. Then, a price adjustment due to the differences is determined. Then, the price of the benchmark computer service model is compared to the price of the computer service contract with the price adjustment.

According to various features of the present invention, the benchmark computer service model and the computer service contract can both include computer program support services, computer hardware support services, a help desk call center service and/or network maintenance services.

According to other features of the present invention the differences between the benchmark computer service and the computer service contract may comprise a difference in type of a computer service, a quantity of a computer service, quality of a computer service, and/or complexity of a computer service. The differences may comprise support for a customer's computer hardware or computer programs which is more difficult to support than computer hardware or computer programs specified in the benchmark service model. The differences may comprise a service constraint in the service contract which is not present in the benchmark service model. The service constraint may be an obligation in the service contract to hire employees of a customer company with which the service contract is made, wherein a service provider of the service contract does not need all of the employees or the cost of the employees is above a market cost. The service constraint may be an obligation in the service contract to provide a help desk call center at a facility of a customer company with which the service contract is made.

According to another feature of the present invention, the price adjustment is based on incremental price of labor and tools to account for the differences between the benchmark computer service and the computer service contract.

BRIEF DESCRIPTION OF THE FIGURES

FIG. 1 is a flow chart illustrating a process embodying the present invention.

DETAILED DESCRIPTION OF THE PREFERRED EMBODIMENTS

Referring now to the drawings in detail, FIG. 1 illustrates a process generally designated 20 for accurately identifying peer selction criteria for benchmarking the market price of computer hardware and program support services, network hardware and program support services, and other computer related services as well, in accordance with the present invention. As explained in more detail below, process 20 adjusts a price or cost estimated by a predefined benchmark service model for differences in service type, volume and quality to arrive at a fair benchmark cost or price for a service contract. Process 20 can be implemented entirely by a person or partially by a person and partially by a computer program 120. The description of process 20 below indicates which functions can be performed by the computer program 120.

Process 20 begins with a service contract 22 between a service provider and a customer company, and a corresponding benchmark service model 24 developed by the benchmarker. The benchmark company may have developed the benchmark service model 24 before it was asked to benchmark service contract 22. So, it is likely that the benchmark service model 24 differs substantially from the service contract 22 in service type, volume and quality. A typical, prior art benchmark service model for computer related services may specify a number of each type of computer resources supported (ex. desktop computer, workstations, laptop computers, servers, etc.), a call response time, a problem fix time, percent availability of servers, a number of help desk calls per year, number of applications supported, number and price of labor/support people, price of support tools (ex. automated call director program, call center programs, and test equipment), and the price of hardware and program assets. Likewise, the service contract includes specification of similar aspects of the service, but usually there are differences in the service type, volume and quality. Also, the service contract may impose other constraints and differences in the organization and structure not found in the benchmark service model. As explained in more detail below, process 20 identifies the differences between the benchmark service model and the service contract, determines the incremental diffrences in labor and tools for these differences, and determines an adjustment to the benchmark service model to account for these differences. Then, a fair comparison can be made between a benchmark result and the service contract price.

Process 20 begins by identifying "definitions" used in the benchmark service model which differ from those used in the service contract, and determining which definition differences affect the computation of service price (step 30). The benchmark service model may include the following definitions of terms that affect the service price:

"Billable Call"—total calls to the help desk, including those ticketed (and handled) and those abandoned before ticketed.

"MIPs"—total MIPs installed in the server, regardless of whether they are all used by the customer company and supported by the service provider. (A "MIP" is a measure of computer processor utilization.)

Likewise, the service contract 12 may include the following definitions of terms that affect the service price. While the terms are the same, in this example, the definitions of the terms are different:

"Billable Call"—total calls to the help desk minus the abandoned calls

"MIPs"—only MIPs used by customer, regardless of the number of MIPs installed in the customer company's computer or the MIPS in computer of the service provider supporting the customer company.

After identifying the definitions from the service contract and benchmark service model that differ from each other and affect the service price (step 30), process 20 determines their affect on the benchmark service model and the appropriate adjustment to the benchmark service model or selected peer (step 32). This detemination varies for each definition and the manner that it impacts the benchmark service model and service contract price. However, the following are some examples. Consider the affect on price due to the differences in the foregoing definitions of "Billable Call". Because the definition of "Billable Call" in the benchmark service model includes abandoned calls, the total price to handle the Billable Calls in the benchmark service model will be more than the total price price to handle the Billable Calls in the service contract, all other things being equal. This is because the price to handle abandoned calls is minimal; some are abandoned before the support person answers the call and others are abandoned later, but before the service person opens a problem ticket. In this example, the price adjustment based on the difference in the definition of "Billable Call" is determined as follows: A contract generated seventeen answered calls and three abandoned calls. Assume that the benchmarker identifies the market price of a call that includes abandons to be $11.00 per call. This yields a total price of (answered calls (seventeen)+abandoned calls (three)) times $11.00 or $220.00. The contract charges $10.00 per call for answered calls only (answered calls (seventeen) times $10.00=$170). To normalize the effect of the difference in definitions, the total contract charges of $170 must be divided by the total call volume of seventeen answered calls+three abandoned calls ($170 divided by (seventeen+three)=$8.50 per call. Consider now the affect on price due to the differences in the foregoing definitions of "MIPs". Because the definition of MIPs in the benchmark service model includes MIPs which are not used, the server support price per MIP in the benchmark service model will be less than the server support price per MIP in the service contract (if there are unused MIPs), all other things being equal. In this example, the adjustment based on the difference in the foregoing definitions of "MIPs" is determined as follows: Assume a customer has a computing capacity of twelve hundred MIPS but the number of MIPS actually used is seven hundred. If the price per used MIP charged by the actual service provider is $8000 this yields a total charge of $5.6 M from the actual service provider). However, the benchmarker calculates the benchmark model using installed MIPS of twelve hundred, so the normalized price per MIP is $5.6M divided by twelve hundred equal $4,667. So, despite the same total charge of $5.6M, it erroneously appears that the benchmarker comparison is less per MIP. In general, the price differential (step 32) is based on the difference in the definitions is determined by an adjustment to the benchmarker's service price as follows:

1. Set Service Standard=actual service contract definition of service.
2. Set Service Contract={Activity1, Activity2, . . . ActivityN}, where each activity is assigned a resource unit measure e.g. "IMAC" event, asset management, desktop support, laptop support, etc.).
3. Compare the Benchmarker's service definition to the service standard definition for each activity, where presence of equivalent activity or task is indicated by '1', absence of equivalent activity or task is indicated by '0', and an activity is outside scope of service standard is indicated by 'X'. For example, the comparison result={1, 1, 0, . . . , 0, X}.
4. Adjust the Benchmarker's designated service fee by subtracting the equivalent incremental charge amount corresponding to any additional activities provided by the benchmarker which is outside the scope of the service contract, e.g. ActivityN+1 is outside the scope of the service contract so subtract the amount [Benchmarker's incremental charge RUN+1*Benchmarker's RUN+1 baseline] from the Benchmarker's service price.

5. Adjust the Benchmarker's designated service fee by adding the equivalent incremental charge amount corresponding to any activities in the service contract but not in the Benchmarker's service. For example, Activity3 is not included in a Benchmarker's service, so the price of Activity3 [Incremental charge RU3*Contract RU3 baseline] would be added to the Benchmarker's service price. Note: if this condition exists, the adjustment amount is added after adjusting for service volume (see step 62 of the normalization method).

In the semi-automated implementation of process 20, computer program 120 receives as input from an operator, an indication of which definitions differ, and whether the respective algorithm/equations contained in the computer program 120 are appropriate to compute the proper adjustment. If so, the operator enters the variables specified in the foregoing algorithms/equations, and then computer program 120 computes the adjustment from those algorithms/equations.

Next, process 20 identifies and summarizes the key service activities and tasks specified in the service contract, i.e. the contract "scope" (step 50). The following are two examples of such summaries of service elements.

Asset Management and Tracking Services

Perform an automated inventory of End-User Systems (Hardware and Software) for machines that are enabled.
Add non-enabled machines to inventory as an install, move, add, change (IMAC) is performed.
Inventory End-User Systems at Remote locations by mail.
Install and enable inventory tracking software on network enabled machines.
Establish and maintain an End-User Machine asset management data base.
Track location changes for End-User Machines including disposals.
Add End-User Machines to the asset management data base as machines are discovered (during a Help Desk call for example).
Update the asset management data base following an install, move, add, change (IMAC).
Provide reports and access to the asset management data base.

Security Services

Implement automated virus protection and eradication procedures on all end user machines.
Promptly issue alerts if viruses are detected or reported.
Track and report virus activity on a monthly basis.

Then, process 20 compares each of the service activities and tasks specified in the service contract summary to the activities and tasks specified in the benchmark service model (step 52). For each difference, process 20 determines an appropriate adjustment to the benchmark service model based on the incremental difference in labor and tools. So, for example, if the service contract includes an activity for managing desktop security, but the benchmark service model does not include this activity, then process 20 determines a fair price for this activity and adds this price to the benchmark service model. Process 20 determines a fair market price for this security activity by estimating the price for the associated labor, assets, and tools to perform the scope of the whole activity based on a market survey of the price of such a service. As another example, if the service contract and benchmark service model both include the same activity, but one has a different scope or magnitude for the activity, then process 20 determines a fair price for this difference in scope based on the incremental labor and tools required. For example, if the service model includes an Asset Management activity without a fully automated inventory of end user machines that occurs monthly or if the model does not differentiate the asset management activity, and the service contract includes a task that requires an automated monthly inventory, then process 20 adds an appropriate price to the benchmark service model based on a market survey of the price of such a service for the difference in scope. If a market price cannot be determined and the service is determined, especially if the service is not a commodity or widely available service, an adjustment is estimated using economic value add analysis.

Next, process 20 identifies a "base line" service volume specified in the service contract (step 60). The following is an example of categories of base line service volume that may be specified in the service contract:

Number of (non abandoned) help desk calls.
Number of end users being supported.
Number of (high-end) work stations being supported.
Number of servers by class being supported.
Number of laptops being supported.
Number of managed circuits in a network.
Number of managed devices in a network.

(If the customer company exceeds the base line service volume, the service contract specifies an add on charge based on the amount of excess. Likewise, if the customer company uses less than the base line service volume, the service contract specifies a credit based on the amount of unused services.) In one embodiment of the present invention, process 20 compares the service volume of the benchmark service model to the base line service volume specified in the service contract (step 62). Then, process determines a adjustment to account for differences between these two service volumes (step 62). For example, if the benchmark service model specifies support of ten thousand desk top computers whereas the service contract specifies a base line support of fifteen thousand desk top computers, then an adjustment should be made to the benchmark service model price for the support of the additional five thousand desk top computers. The adjustment is based on the additional labor and tools required to support the additional desk top computers. As another example, if the benchmark service model specifies ten thousand help desk calls whereas the service contract specifies a base line of twenty thousand help desk calls, then the benchmark service model price for this service would be increased based on the additional labor and and tools required to support the additional help desk calls and the price for these in the market place. In other examples, the differential is likewise based on the difference in the incremental labor and tools required and the price in the market place for these. There are known prices for labor for different skill classes required for the activity or task, and a retail price for the tools required for the activity or task. The differential based on the difference in the definition is determined as follows:

1. Adjust Benchmarker's Service Price for Service Volume.
2. Perform regression analysis on sample population's price and Resource Unit (RU) data to determine the price multipliers reflecting the service's economies of scale effect.
3. Price multiplier is normalized such that the price multiplier for the RU volume band containing the contract RU amount is equal to '1'. For example, RU=IMAC_event.
4. Using Benchmarker's RU volume, look-up corresponding price multiplier and adjust Benchmarker's service price. For example, Volume adjusted Benchmarker's Price= [Benchmarker's scope adjusted price*Price multiplier].
5. Add any scope adjustment amounts to the Benchmarker's volume-adjusted service price (from step 52 of the normalization method).

| IMAC event Band | Example Price Multiplier for Adjustment |
| --- | --- |
| 0-25000 | 2.0 |
| 25001-50000 | 1.5 |
| 50001-75000 | 1.2 |
| 75001-100000 | 1.0 |
| 100001-125000 | 0.8 |

In the semi-automated implementation of process 20, computer program 120 receives as input from an operator, an indication of which definitions differ, and whether the respective algorithm/equations contained in the computer program 120 are appropriate to compute the proper adjustment. If so, the operator enters the variables specified in the foregoing algorithms/equations, and then computer program 120 computes the adjustment from those algorithms/equations.

Next, process 20 identifies from the service contract other, complexity or simplification factors that affect the service price (step 70). Examples of these other complexity or simplification factors include the following:

geographic distribution of the customer company's computer facilities (ex. data center distribution, server distribution, desk top distribution, laptop distribution).

number of different operating systems supported under the service contract.

number of desktop images (for exampe, each business unit, or in some cases departments or individuals, may have different programs and configurations) supported under the service contract.

difficulty of implementing the help desk call center (ex. coordination between multiple worldwide help desks, amount of reporting or follow-up/wrap requirements for each call, number of customized applications which require special expertise, multiple language support).

number of computers supporting different business units without the possibility of or requirement for logical consolidation.

number of on-line transaction regions or logical partition units supported.

distribution of servers and uniqueness of configurations.

support for customer companies that had recently merged and have not yet integrated their computer systems, processes, and tools.

support for customer company architectures that have grown without an overall network design.

existence of multiple network protocols.

use of proprietary hardware protocols in networks.

high level of security required.

Then, process 20 determines which of these other complexity or simplification factors differ from the benchmark service model (step 72). For each of these other complexity or simplification factors, process 20 then determines an adjustment to the benchmark service model price based on the difference in labor and tools compared to the service contract (step 72). For example:

1. Establish measures of complexity and specificity. For example, location complexity is measured by the location density, defined as average number of seats per location address. As another example, labor specificity is measured by total labor hours restricted to the service contract.
2. Perform regression analysis on sample population's price and complexity (specificity) measurement data to determine the price multipliers reflecting three levels of complexity (specificity)—high, medium and low. The following is an example.

| Location | density | Example Price Multiplier |
| --- | --- | --- |
| High: | >3001 | 1.1 |
| Medium: | 1001-3000 | 1.0 |
| Minimum: | <1000 | 0.8 |

3. Adjust the Benchmarker's scope-& volume-adjusted service price to reflect the same level (high, medoium, low) of service complexity (specificity) corresponding to the Contract service complexity (specificity) level. For example, if the Benchmarker's service complexity level is medium and Contract's is high, the price multiplier is used to mark-up the Benchmarker's service price to reflect equivalent service complexity.

In the semi-automated implementation of process 20, computer program 120 receives as input from an operator, an indication of which factors differ, and whether the respective algorithm/equations contained in the computer program 120 are appropriate to compute the proper adjustment. If so, the operator enters the variables specified in the foregoing algorithms/equations, and then computer program 120 computes the adjustment from those algorithms/equations.

Next, process 20 identifies structure and organization terms and service constraints of the service contract (step 80). Examples of the structure and organization terms in the service contract are as follows:

a requirement for the service provider to purchase customer company's computer assets at a price greater than market value, for example, book value (for use in the customer company).

a requirement for the service provider to use specific employees, for example, protected labor, specifc professionl certification, or specified types of businesses in the performance of the service.

a requirement for the service provider to hire customer company's employees at inflated salaries and benefits or when not all needed by the service provider to support the customer company.

caps on an allowed increase in fees in the service contract due to inflation.

guarantees on productivity improvement/cost reduction for certain services.

service level penalties for not meeting a specified service level, for example, failing to meet a specified response time to fix certain types of problems.

Examples of service constraints in the service contract are as follows:
- whether the customer has the right to "own" its architecture and standards, i.e. decide what hardware, software and tools to use, and how long to keep and maintain antiquated hardware, software and tools.
- whether the customer can decide what information technology support processes to use.
- whether the service provider has direct authority/privilege to access the customer company's software or whether the service provider has to work through an intermediary employee of the customer company.
- whether responsibility for any services are shared between the service provider and the customer company, and therefore require the service provider to coordinate with the customer company, for example, only the customer retains root access to an operating system.
- whether the help desk call center must be on the premises of the customer company.

Then, process 20 determines which of these structure and organization terms and service constraints are absent from the benchmark service model, and the additional price in terms of labor and tools required for each such structure and organization term and each service constraint in the service contract (step 82). The price differential based on the difference in the definition is determined as follows:
1. Adjust Benchmarker's Service Price for Service Constraint.
2. Set Service Standard=contract definition of service constraint.
3. Sett Service Standard={Activity1, Activity2, ... ActivityN}. Each activity corresponds to a resource unit measure (e.g. Coordination for root access event).
4. Compare the Benchmarker's service definition to the service standard. Presence of equivalent activity or task is indicated by '1'.
5. Adjust the Benchmarker's designated service fee by adding the equivalent incremental charge amount corresponding to the service constraint activities. Note: if this condition exists, the adjustment amount is added after adjusting for service volume.

In the semi-automated implementation of process 20, computer program 120 receives as input from an operator, an indication of which factors differ, and whether the respective algorithm/equations contained in the computer program 120 are appropriate to compute the proper adjustment. If so, the operator enters the variables specified in the foregoing algorithms/equations, and then computer program 120 computes the adjustment from those algorithms/equations.

Next, process 20 identifies contract service levels/quality requirements specified in the service contract (step 90). Examples of the service level/quality requirements are as follows:
- percent availability of the servers.
- percent availability of the networks.
- response time for answering calls at the help desk call center, and for a support person to arrive at a server or network device to fix it.
- mean time to repair computer hardware or applications, usually based on severity level of problem.
- maximum number of defects in program code written by the service provider.
- success rate of electronic distribution of software by service provider.
- time to respond to move, add and change requests.

Then, process 20 determines which of these service level/quality requirements differ from the benchmark service model, and the additional market price in terms of labor and tools due to the difference in quality requirements (step 92). Next, regression analysis is performed on sample population's price and service level data to determine the price multipliers reflecting three levels of service: premium, average, minimum. For example, Percentage of Help Desk Calls Resolved on Level1:

| Level1 Resolution % | Example Price Multiplier |
| --- | --- |
| Premium: 81%-100% | 1.1 |
| Average: 61%-80% | 1.0 |
| Minimum: <60% | 0.8 |

Next, adjust the Benchmarker's scope and volume-adjusted service price to reflect the same level (premium, average, minimum) of service quality corresponding to Contract designated service level. For example, if the Benchmarker's service level is standard and the Contract is premium, the price multiplier is used to mark-up the Benchmarker's service price to reflect equivalent service quality.

In the semi-automated implementation of process 20, computer program 120 receives as input from an operator, an indication of which factors differ, and whether the respective algorithm/equations contained in the computer program 120 are appropriate to compute the proper adjustment. If so, the operator enters the variables specified in the foregoing algorithms/equations, and then computer program 120 computes the adjustment from those algorithms/equations.

Next, process 20 sums together all the adjustments to the pricess determined in steps 32, 52, 62, 72, 82 and 92, and adds those to the benchmark service model to make a final comparison to the service contract price (step 100).

Based on the foregoing, a process and computer program product have been disclosed for adjusting a benchmark service model to account for differences in service type, volume and quality to accurately estimate a fair price for a service contract. However, numerous modifications and substitutions can be made without deviating from the scope of the present invention. For example, the steps of process 20 as shown in FIG. 1 can be implemented in any order, and not all the steps are needed to improve the accuracy of the benchmarking. Therefore, the present invention has been disclosed by way of illustration and not limitation, and reference should be made to the following claims to determine the scope of the present invention.

The invention claimed is:
1. A process for adjusting a price derived from a benchmark computer service model to a price of a computer service contract, said process comprising the steps of:
 determining differences in predefined service definitions between said benchmark computer service model and said computer service contract, wherein said benchmark computer service model provides a model of current market conditions that pertain to benchmark service terms contained therein and said computer service contract is a current, preexisting contract between a customer and a service provider that does not reflect current market conditions that pertain to contract service terms contained therein, wherein the computer service contract specifies services provided to the customer by the service provider, and wherein said differences comprise a service constraint in said service contract which is not present in said benchmark computer service model, said service constraint comprising one of an obligation in said service contract to hire employees of a customer company with which said service contract is made, wherein a service provider of said service contract does not need all of said employees or the price of said employees is above a market price, and an obligation in said service contract to provide a help desk call center at a facility of a customer company with which said service contract is made;

determining a price adjustment due to said differences;

comparing, by a computer-implemented process, the price of said benchmark computer service model to the price of said computer service contract with said price adjustment; and modifying said computer service contract by adjusting the price of said computer service contract to reflect the price adjustment due to said differences.

* * * * *